(12) United States Patent
Schilt

(10) Patent No.: US 6,471,253 B2
(45) Date of Patent: Oct. 29, 2002

(54) INSERT COUPLING

(75) Inventor: Piet Schilt, Schoonhoven (NL)

(73) Assignee: Insigne-Berg Groep B.V. (NL)

( * ) Notice: Subject to any disclaimer, the term of this patent is extended or adjusted under 35 U.S.C. 154(b) by 0 days.

(21) Appl. No.: 09/804,951

(22) Filed: Mar. 13, 2001

(65) Prior Publication Data

US 2001/0033079 A1 Oct. 25, 2001

(30) Foreign Application Priority Data

Mar. 15, 2000 (NL) .............................................. 1014653
Jan. 3, 2001 (NL) .............................................. 1017020

(51) Int. Cl.[7] .................................................. F16L 17/02
(52) U.S. Cl. ...................... 285/321; 285/339; 285/332.1
(58) Field of Search .............................. 285/305, 332.1, 285/332.2, 339, 321, 903

(56) References Cited

U.S. PATENT DOCUMENTS

| 3,434,745 A | * | 3/1969 | Jackman ................. 285/321 X |
| 3,684,320 A | * | 8/1972 | Platzer et al. ........... 285/305 X |
| 3,920,270 A | * | 11/1975 | Babb, Jr. ................. 285/321 X |
| 4,083,586 A | * | 4/1978 | Helm ..................... 285/321 X |
| 4,431,216 A | | 2/1984 | Legris ........................ 285/104 |
| 4,805,932 A | * | 2/1989 | Imhof et al. ............ 285/339 X |
| 5,895,078 A | * | 4/1999 | LeClinche .................. 285/305 |
| 6,340,181 B1 | * | 1/2002 | Amatsutsu .................. 285/321 |

FOREIGN PATENT DOCUMENTS

| FR | 2227482 | 11/1974 |
| GB | 2036224 | 6/1980 |
| GB | 2066913 | 7/1981 |

* cited by examiner

Primary Examiner—Lynne H. Browne
Assistant Examiner—David E. Bochna
(74) Attorney, Agent, or Firm—Ostrolenk, Faber, Gerb & Soffen, LLP

(57) ABSTRACT

An insert coupling for connecting a flexible pipe section to another part comprises a housing with a first cylindrical bore, a sealing ring, which is effective between the flexible pipe section and the cylindrical bore, a clamping bush with a cylindrical inner surface, which in the region near the insertion side is followed by a conical part, and a clamping ring, accommodated in the clamping bush and provided with at least one radially inward projecting tooth. The conical part of the clamping bush by way of the clamping ring exerts a clamping force on the flexible pipe section when a load occurs on the flexible pipe section in the axial direction towards the insertion side. The clamping ring is formed as a ring cut through substantially in the axial direction at one point.

8 Claims, 5 Drawing Sheets

INSERT COUPLING

FIELD OF THE INVENTION

The present invention relates to an insert coupling for connecting a flexible pipe section to another part.

BACKGROUND OF THE INVENTION

Such an insert coupling is known in many embodiments. The disadvantage of such couplings is that they work in a manner that seals and clamps well only when pipes with a smooth surface are used. For the installation of Jacuzzis, use is made of flexible pipe sections with a spiral reinforcement provided therein, which means that, as a result of the spiral reinforcement, the outer surface of the pipe section is not smooth. In general, these types of pipe sections are glued, in order to obtain a good seal. The disadvantage of gluing the pipe sections is that the pipe section can no longer be rotated after the glue has hardened, which can make fitting in narrow spaces more difficult. Besides, the glue components can be polluting for the environment.

SUMMARY OF THE INVENTION

The object of the invention is to provide an insert coupling which overcomes the above mentioned disadvantages.

This object is achieved by an insert coupling for connecting a flexible pipe section to another part having therein a relatively hard spiral-shaped reinforcement, comprising a housing having therein a first cylindrical bore, which extends from an insertion side to a second cylindrical bore with a diameter which is smaller than the diameter of the first bore and which substantially corresponds to an external diameter of the flexible pipe section, so that a shoulder is produced as a boundary of the first bore. The insert coupling furthermore comprises a sealing ring, which rests against the shoulder in the first cylindrical bore and is effective between the flexible pipe section and the first cylindrical bore. The insert coupling also comprises a clamping bush, which is provided immovably in the axial direction in the first cylindrical bore and extends to the insertion side of the bore situated opposite the shoulder, the clamping bush having a cylindrical inner surface which in the region near the insertion side passes into a conical part that tapers towards the insertion side. Also, the insert coupling comprises a clamping ring accommodated in the clamping bush and having a supporting surface, which is situated on the inside, and which on the insertion side is provided with at least one radially inward projecting tooth, which has an end face that runs from the supporting surface substantially in the radial direction and a clearance face lying behind it and sloping outwards towards the insertion side, with an angle of inclination relative to the axial direction. The conical part on the inside surface of the clamping bush by way of the clamping ring causes a radially inward directed clamping force on the flexible pipe section when a load occurs on the flexible pipe section in the axial direction towards the insertion side, and in which the clamping ring is in the form of a ring cut through at one point substantially in the axial direction, from which clamping ring a cylindrical segment has been removed at the position of the cut.

The advantage of removing a cylindrical segment from the clamping ring is that, under the influence of the conical part of the clamping bush, the clamping ring can undergo a diameter reduction when a tensile force is exerted upon the pipe section in the direction of the insertion side, with the result that the clamping ring is clamped more firmly around the pipe section, but said clamping ring can still rotate along with the pipe section during the fitting operation, in order to be able to position the latter well in a certain space. In this design the clamping ring is also simple to manufacture.

In an advantageous embodiment the tooth height of the tooth on the clamping ring is dependent on the diameter of the flexible, reinforced pipe section. Preferably the tooth height is chosen 3% of the pipe diameter, so that the tooth engages well in the pipe material, but the pipe wall does not become so damaged that leakage occurs. For a good engagement the tooth shape is also important. In a preferred embodiment the end face is situated substantially perpendicular to the inside ring wall, and the clearance face is situated at an angle of approximately 45° to the end face.

The conical part of the clamping bush is preferably oriented at an angle of approximately 30° to the cylindrical inner surface, so that with a slight axial displacement of the pipe section in the direction of the insertion side a sufficiently great diameter reduction of the clamping ring is achieved to grip the pipe section in a clamped fit.

The invention will be explained in greater detail with reference to the drawings.

DETAILED DESCRIPTION OF THE PREFERRED EMBODIMENTS

Figure 1:
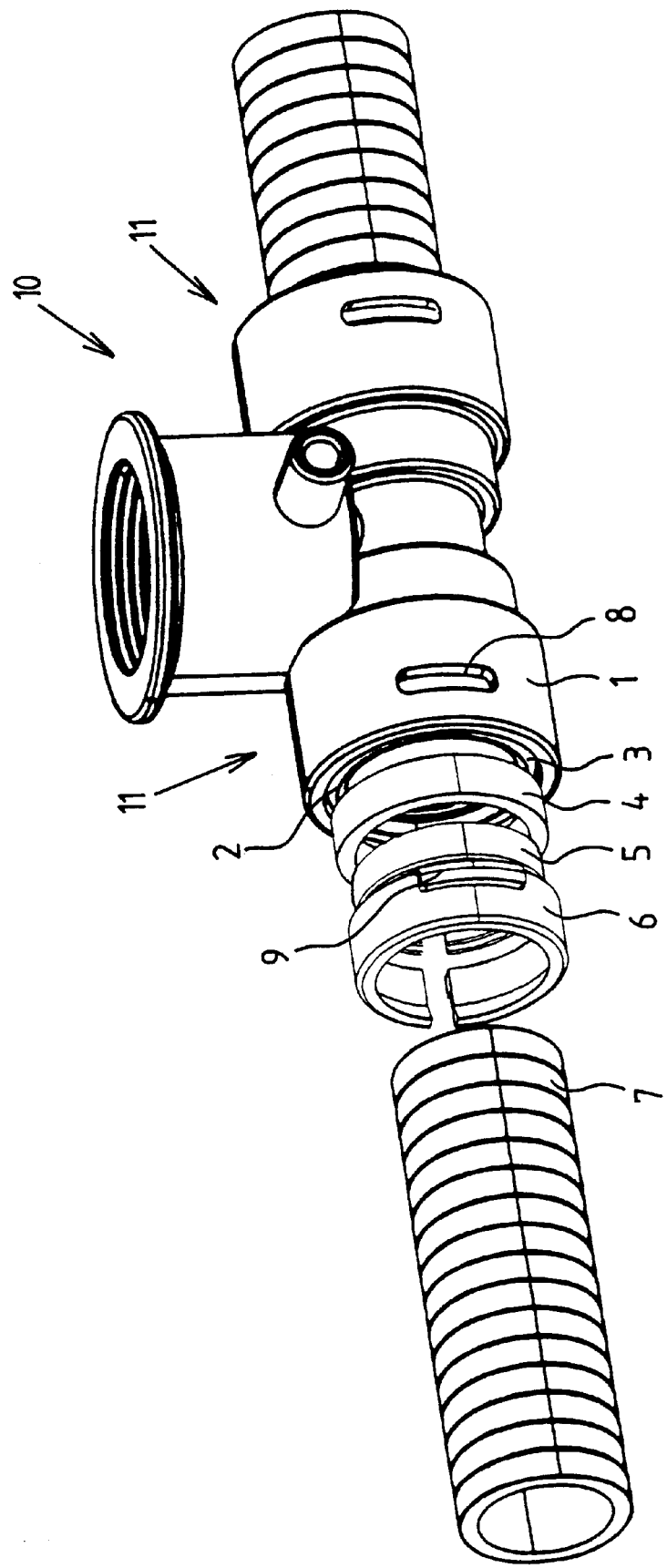
FIG. 1 shows a perspective view of a connecting piece provided with two insert couplings.

FIG. 1 shows by way of example a connecting piece 10 provided with two insert couplings 11 according to the invention. The insert coupling 11 comprises a housing 1 with an internal cylindrical bore 2. A sealing ring 3, an intermediate ring 4 and a clamping bush 6 containing a clamping ring 5 are inserted in succession in the bore 2. A flexible pipe section 7 with reinforcement is connected to the connecting piece 10 by sliding said flexible pipe section into the insert coupling. Openings 8 are made through the wall of the housing 1, in which openings 8 projections 9, provided on the outside of the clamping bush 6, can be accommodated, with the result that the clamping bush 6 is fixed in the axial direction and in the circumferential direction in the bore 2 of the housing 1.

Figure 2:
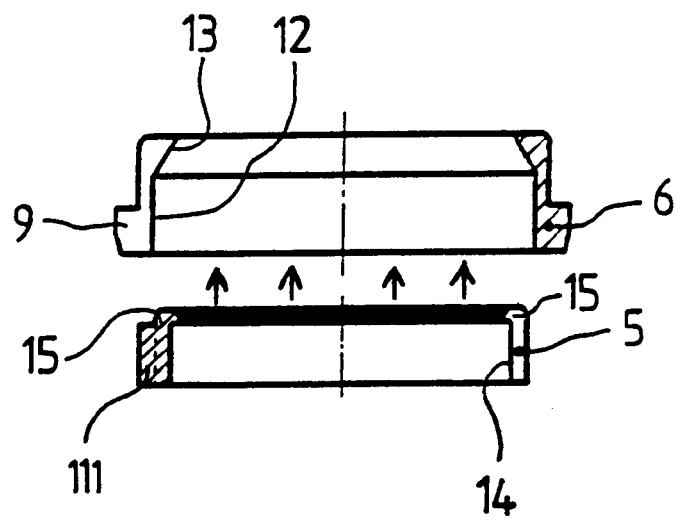
FIG. 2 shows a cross section of a clamping bush with a clamping ring.

FIG. 2 shows a clamping bush 6 which has a cylindrical inner surface 12, which in the region of the insertion side passes into a conical part 13, which decreases in diameter towards the insertion side. The clamping ring 5 is in the form of a cut-through cylindrical ring from which a cylindrical segment has been removed over the entire axial length of the clamping ring 5. The clamping ring 5 has a supporting surface 14, which is situated on the inside, and which on the insertion side is provided with a tooth 15 projecting radially inwards. The clamping ring 5 in the embodiment shown here has on the outer surface a projection 111, which fits into the cut of the clamping bush 6. Said projection 111 ensures that in the fitted state the clamping ring 5 cannot rotate about its axis. However, this is not necessary and, as can be seen in the embodiment in FIG. 1, the clamping ring 5 can also be designed without projection 111. The arrows indicate how the clamping ring 5 is pushed into the clamping bush 6.

Figure 3:
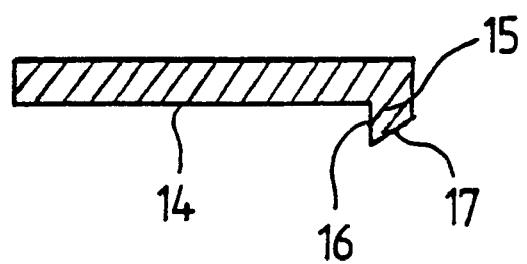
FIG. 3 shows a cross section of the tooth on the clamping ring.

In FIG. 3 the tooth 15 is illustrated with an end face 16 which runs substantially in the radial direction from the supporting surface 14, and a clearance face 17 lying behind it which slopes outwards towards the insertion side, with an angle of inclination relative to the axial direction. The fact that the clearance face 17 slopes outwards has the advantage that the clearance face 17 serves as a guide during the insertion of the flexible pipe 7 into the insert coupling, which makes the insertion easier. The angle of inclination must not be too large, otherwise the guidance of the pipe section 7 will be more difficult during the insertion. On the other hand, it is desirable for the angle of inclination not to be too small, otherwise the tooth 15 will acquire too blunt a shape, so that it can no longer engage well in the pipe material. The clearance face 17 therefore preferably has an angle of inclination of approximately 45° relative to the axial direction.

The tooth height, which corresponds to the length of the end face 16, is dependent on the pipe diameter. It is advantageous to make the tooth height approximately 3% of the pipe diameter. This means that the tooth 15 can never engage too deeply in the pipe section 7, thereby causing damage to the pipe wall. In the unloaded state the diameter of the point of the tooth 15 corresponds to the external diameter of the pipe, which means that in the unloaded state the supporting surface 14 has a diameter that is 3% larger than the external diameter of the pipe. When there is full engagement of the tooth 15 in the pipe material the supporting surface 14 therefore rests against the outer wall of the pipe.

Figure 4:
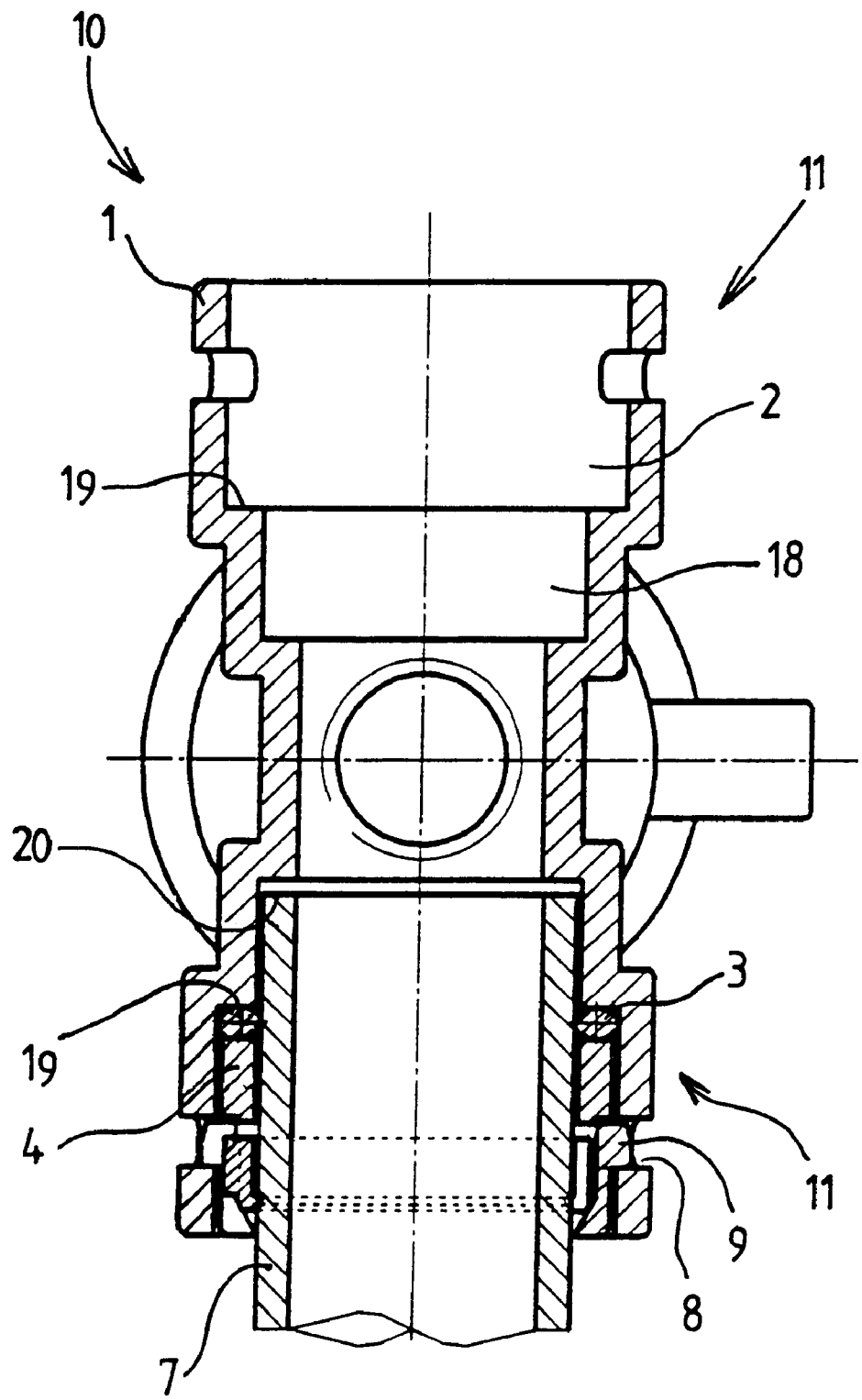
FIG. 4 shows a section in the longitudinal direction of the connecting piece according to FIG. 1.

FIG. 4 shows a bottom view in section of the connecting piece 10 of FIG. 1, in which on one side an insert coupling 11 is situated in the fitted state, into which insert coupling a flexible pipe section 7 has been inserted. The empty housing 1 of the insert coupling 11 is shown on the other side. The first bore 2 is shown in this housing. This first bore 2 is followed by a second bore 18, which has a smaller diameter than the first bore 2. The difference in diameter between the first bore 2 and the second bore 18 produces a shoulder 19. The openings 8 are provided radially opposite each other in the wall of the housing 1.

In the bore 2 with the fitted insert coupling the sealing ring 3 is fitted against the shoulder 19. The sealing ring 3 used is preferably an O-ring. The sealing ring 3 is pressed by the clamping bush 6 by way of the intermediate ring 4 against the shoulder 19, so that said sealing ring deforms slightly. The whole unit is fixed in the axial direction through the projections 9 on the external surface of the clamping bush 6 being accommodated in the openings 8. In this embodiment the clamping bush 6 is cut through in the radial direction over its whole axial length at the level of one of the projections 9, a cylindrical segment being removed from the clamping bush 6, so that the clamping bush 6 can deform during the insertion into the housing 1, which makes the insertion of the projections 9 into the openings 8 possible.

The pipe section 7 is inserted from the insertion side, and pipe end 20 is accommodated in the second bore 18 beyond the sealing ring 3. The tooth 15 of the clamping ring 5 lies on the wall of the pipe section 7. If the pipe section 7 is pulled back in the direction of the insertion side, the clamping ring 5 is reduced in diameter as a result of the conical part 13 in the clamping bush 6 acting on it, wich results in the tooth 5 engaging more deeply on the pipe section 7, so that the pipe section 7 cannot be pulled out of the insert coupling.

The angle of inclination of the conical part 13 determines how far the clamping ring 5 with the pipe pushed into it can be moved in the axial direction towards the insertion side before it is positioned in a tight fit. It is advantageous to make said angle large, so that a slight axial displacement results in a large diameter reduction of the clamping ring 5, with the result that the axial dimensions of the clamping bush 6 can remain small. On the other hand, too large an angle of inclination is a disadvantage for the guidance of the clamping ring 5 in the axial direction, so that the displacement of the clamping ring 5 is too large in the axial direction, wich results in the possibility of the diameter reduction then being too small to hold the pipe section 7 in a tight fit in the insert coupling. Therefore, preferably an angle of inclination of approximately 30° relative to the cylindrical inner surface of the clamping bush 6 is chosen.

In the embodiment described above an intermediate ring 4 is situated between the sealing ring 3 and the clamping bush 6. It is also possible, for example, to make the intermediate ring and the clamping bush integral, or to omit the intermediate ring 4.

Other embodiments of the clamping bush 6 and the clamping ring 5 are also possible besides the embodiment described above.

Figure 5:
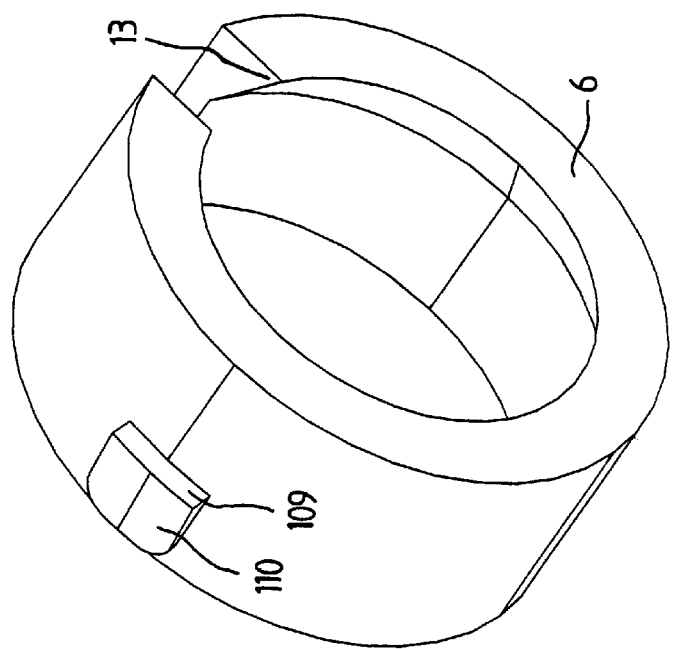
FIG. 5 shows a perspective view of another embodiment of a clamping bush with a clamping ring.
Figure 5:
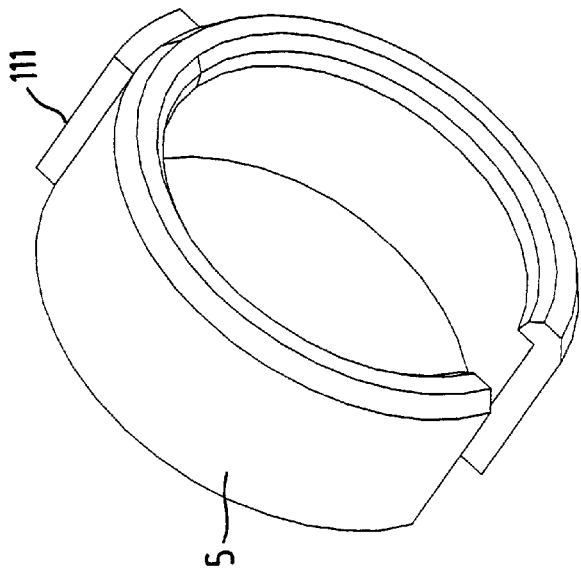

FIG. 5 shows an embodiment of a clamping bush and a clamping ring, in which similar parts to those in the embodiment described above are indicated by the same reference numerals.

The clamping bush 6 is formed as an over the axial length cut-through ring. On the outer surface the clamping bush 6 is provided with projections 109 lying radially opposite each other, which are designed to be accommodated in the openings 8 in the housing 1. The difference from the embodiment described earlier is that the clamping bush 6 is not cut through at the level of one of the projections 109, but at a point that has been rotated 90° about the axis relative to the radial connecting line between the projections 109.

The projections 109 further have a radial outside face 110 that in the axial direction slopes upwards in the direction of the insertion side. This upward sloping face has a guiding effect during the insertion of the clamping bush 6 in the housing 1, and facilitates the insertion.

The clamping ring in FIG. 5 corresponds to the clamping ring 5 that can also be seen in FIG. 2, provision being made on the outer surface of the clamping ring 5 for a projection 111 which fits into the opening produced by cutting through the clamping bush 6, in the case of which a ring segment is removed, and ensures that in the fitted state the clamping ring 5 cannot rotate about its axis.

Figure 6:
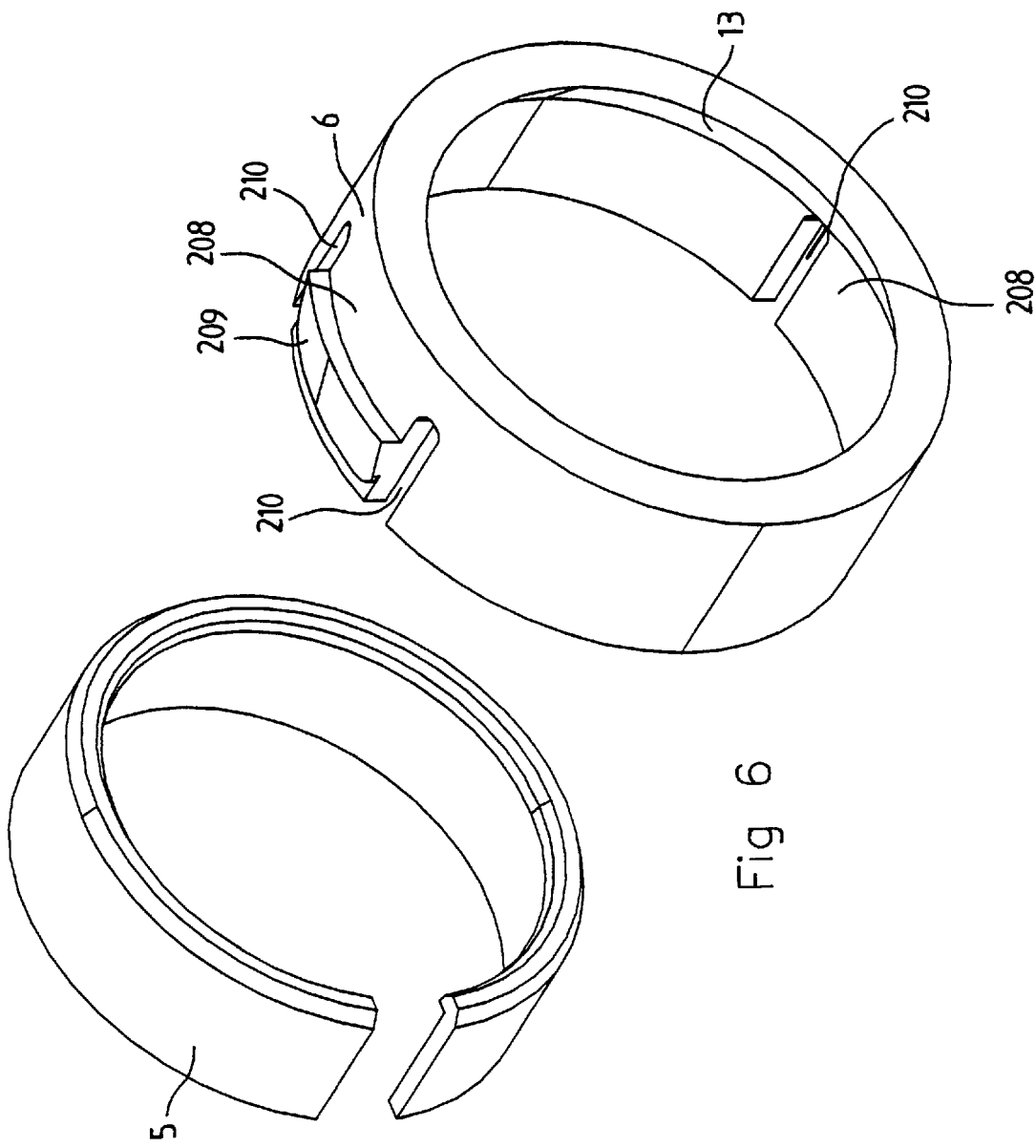
FIG. 6 shows a perspective view of yet another embodiment of a clamping bush with a clamping ring.

Yet another embodiment of a clamping bush 6 and a clamping ring 5 is shown in FIG. 6. The clamping bush 6 in this embodiment is not in the form of a cut-through ring, but is in the form of a closed ring that is provided with deformable lips 208. The lips 208 are bounded on either side by slits 210, extending axially from the conical part 13 to the opposite edge. The lips 208 are provided with a projection 209 on the outer surface. When the clamping bush 6 is being inserted into the housing the lips 208 bend radially inwards, after which the projections 209 can grip behind an edge of one of the openings 8 in the housing 1. In FIG. 6 the clamping bush 6 is provided with two lips 208 lying radially opposite each other, but this can also be a different number, the lips 208 preferably being distributed at regular intervals around the circumference of the clamping bush 6. The clamping ring 5 in this embodiment is the same as the clamping ring 5 shown in FIG. 1, in other words without projection on the outer surface.

What is claimed is:

1. An insert coupling for connecting a flexible pipe section to another part having therein a relatively hard spiral-shaped reinforcement, comprising:

a housing having therein a first cylindrical bore, which extends from an insertion side to a second cylindrical bore with a diameter which is smaller than the diameter of the first bore and which substantially corresponds to an external diameter of the flexible pipe section, so that a shoulder is produced as a boundary of the first bore;

a sealing ring, which rests against the shoulder in the first cylindrical bore and is effective between the flexible pipe section and the first cylindrical bore;

a clamping bush, which is provided immovably in the axial direction in the first cylindrical bore and extends to the insertion side of the bore situated opposite the shoulder, the clamping bush having a cylindrical inner surface which in the region near the insertion side passes into a conical part that tapers towards the insertion side;

a clamping ring accommodated in the clamping bush and having a supporting surface, which is situated on the inside, and which on the insertion side is provided with at least one radially inward projecting tooth, which has an end face that runs from the supporting surface substantially in the radial direction and a clearance face lying behind it and sloping outwards towards the insertion side, with an angle of inclination relative to the axial direction, in which the conical part on the inside surface of the clamping bush by way of the clamping ring causes a radially inward directed clamping force on the flexible pipe section when a load occurs on the flexible pipe section in the axial direction towards the insertion side, and in which the clamping ring is in the form of a ring cut through at one point substantially in the axial direction, from which clamping ring a cylindrical segment has been removed at the position of the cut.

2. The insert coupling of claim 1, in which the height of the tooth corresponds to approximately 3% of the external diameter of the flexible pipe section.

3. The insert coupling of claim 2, in which the diameter of the supporting surface of the clamping ring when the pipe section is not inserted is approximately 3% larger than the external diameter of the flexible pipe section.

4. The insert coupling of claim 1, in which the diameter of the supporting surface of the clamping ring when the pipe section is not inserted is approximately 3% larger than the external diameter of the flexible pipe section.

5. The insert coupling of claim 1, in which the angle of inclination of the clearance face relative to the axial direction is approximately 45°.

6. Insert coupling of claim 1, in which the face of the conical part in the clamping bush is at an angle of approximately 30° to the cylindrical inner surface.

7. Insert coupling of claim 1, in which the clamping bush is formed as a ring cut through at one point, from which clamping bush a cylindrical segment has been removed at the position of the cut.

8. Insert coupling of claim 1, in which the clamping bush is formed as a closed ring that is provided with a number of deformable lips.

* * * * *